United States Patent Office 3,535,359
Patented Oct. 20, 1970

3,535,359
STABILIZATION OF ORGANIC ISOCYANATES
David H. Chadwick, New Martinsville, W. Va., Guenter K. Rockstroh, Pittsburgh, Pa., and Eugene L. Powers, New Martinsville, W. Va., assignors to Mobay Chemical Company, Pittsburgh, Pa., a corporation of Delaware
No Drawing. Filed Mar. 22, 1966, Ser. No. 536,272
Int. Cl. C07c 119/04
U.S. Cl. 260—453         8 Claims

ABSTRACT OF THE DISCLOSURE

Organic isocyanates are stabilized with ortho-esters having the formula R'C(OR)$_3$ wherein R' is hydrogen, alkyl, alkenyl, aryl, haloalkyl or aralkyl and R is alkyl or alkenyl of 1 to 18 carbon atoms, chloroethyl, phenyl or aralkyl.

---

This invention relates to organic isocyanates and more particularly to the stabilization of organic isocyanates against degradation and loss of their valuable properties.

Organic isocyanates are reactive with a whole host of compounds through the highly unsaturated —N=C=O group and may even react with themselves. Their highly reactive character makes them difficult to store. The normally clear isocyanates tend to discolor and yellow and even turn a dark brown on storage. Furthermore, all isocyanates, even the solid ones are quite sensitive to moisture. The liquid organic isocyanates tend to become more viscous even in the absence of moisture or other reactive materials on storage in closed containers.

It has been proposed heretofore to employ various additives for the purpose of improving the storage characteristics of organic isocyanates. For example, it is proposed in U.S. Pat. 2,885,423 to use alkyl or aryl esters of carbonic acid for the purpose of stabilizing an organic isocyanate against discoloration. The esters of carbonic acid, such as diethyl carbonate, have essentially no effect on the stabilization of an organic isocyanate against a viscosity increase or against polymerization on storage. Many of these heretofore known additives are unsatisfactory for various reasons even though they may be effective for one desired purpose. Thus, some additives are highly toxic and have an obnoxious odor while others interfere with the subsequent use of the isocyanate for some use, for example, for the preparation of polyurethane foam where flame retardency, cell structure, cell stability and the like may suffer because of the nature of the additive.

It is therefore an object of this invention to provide stabilized organic isocyanates which are substantially free of the foregoing disadvantages. Another object of this invention is to provide organic isocyanates which are stabilized against more than one kind of degradation. Still a further object of this invention is to provide an improved mixture of organic polyisocyanates which is stable to viscosity changes. Still another object of this invention is to provide organic isocyanates which are stable for long periods of time as to color and increases in viscosity.

The foregoing objects and others are accomplished in accordance with the invention, generally speaking, by providing organic isocyanates stabilized with an ortho-ester having the formula R'C(OR)$_3$, wherein R' is hydrogen, alkyl, alkenyl, aryl, haloalkyl or aralkyl and R is alkyl or alkenyl of 1 to 18 carbon atoms or aralkyl.

The above defined ortho-ester employed in the process of the present invention may be mixed with the organic isocyanate in any suitable proportion which is effective to stabilize the isocyanate against the objectionable deterioration. The unique feature of the invention is that certain ortho-esters are capable of stabilizing the isocyanates against several different kinds of degradation simultaneously and when present in only very small amounts. It is possible when employing a liquid polyphenyl polymethylene polyisocyanate with only very minor amounts of the ortho-esters of the present invention to stabilize the isocyanate against both water sensitivity in reasonable amounts and viscosity increases. In severe tests, where as much as 0.1% by weight of water is added to the stabilized isocyanate, considerably less change in viscosity has been noted than in unstabilized samples. When a substantially anhydrous isocyanate is mixed with the ortho-ester of the invention and placed in a sealed container, substantially no increase in viscosity is apparent after weeks of storage whereas an unstabilized organic isocyanate shows an increase in viscosity of about 2 to 5% per week.

Any suitable ortho-ester may be used in accordance with the process of the present invention, and in order to prepare the novel stabilized organic isocyanates of the present invention. Thus, one many employ esters of ortho-formic acid,
ortho-acetic acid,
ortho-propionic acid,
ortho-butyric acid,
ortho-valeric acid,
ortho-caproic acid,
ortho-enanthic acid,
ortho-caprylic acid,
ortho-pelargonic acid,
ortho-capric acid,
ortho-hendecanoic acid,
ortho-lauric acid,
ortho-tridecanoic acid,
ortho-myristic acid,
ortho-pentadecanoic acid,
ortho-palmitic acid,
ortho-margaric acid,
ortho-stearic acid,
ortho-nonadecanoic acid,
ortho-acrylic acid,
ortho-methacrylic acid,
ortho-crotonic acid,
ortho-3-butenoic acid,
ortho-tiglic acid,
ortho-senecioic acid,
ortho-sorbitic acid,
ortho-tetrolic acid,
ortho-benzoic acid,
ortho-2-naphthaolic,
ortho-cyclohexyl acetic acid,
ortho-para-chloroformyl benzoic acid,
ortho-phenyl acetic acid and the like.

The ester group represented by R in the foregoing formula may be methyl, ethyl, propyl, butyl, butenyl, hexyl, heptyl, octyl, nonyl, n-decyl, n-dodecyl, tri-decyl, tetra-decyl, penta-decyl, hexa-decyl, hepta-decyl, octyl-decyl or the like; or it may be aralkyl, such as benzyl, beta-phenylethyl, gamma propyl, crotyl, allyl, oleyl, beta-chloro-ethyl, phenyl or the like. Specific compounds include trimethyl ortho formate, triethyl ortho formate, tripropyl ortho formate, methyl diethyl ortho formate, diethyl phenyl ortho formate, diethyl propyl ortho formate, dibutyl ethyl ortho formate, tribenzyl ortho formate, tricrotyl ortho formate, trichloroethyl ortho formate, dipropyl ethyl ortho formate, dioleyl ethyl ortho formate, diisodecyl ethyl ortho formate, diisobutyl ethyl ortho formate, trimethyl ortho acetate, triethyl ortho propionate, triethyl ortho butyrate, triethyl ortho valerate, tributyl ortho caprolate, triethyl ortho enanthoate, trimethyl ethyl ortho caprylate, triethyl ortho pelargonate, triethyl ortho caprioate, triethyl ortho laurate, triethyl ortho tridecanonate, triethyl ortho myristoate, triethyl ortho pentadecanoate, triethyl ortho palmitate, triethyl ortho margarate, triethyl ortho stearate, triethyl ortho nonadecanoate, triethyl ortho acrylate, triethyl ortho methacrylate, triethyl ortho benzoate, triethyl ortho chloroacetate, triethyl ortho cyclohexane acetate, triethyl ortho benzene acetate, triisodecyl ortho formate, triisobutyl ortho formate, tripropenyl ortho formate, mixed trioleyl (25% stearyl, 75% oleyl) ortho formate.

While a wide variety of isocyanates can be stabilized in accordance with the method of the present invention, it is preferred to use the method of the present invention to stabilize liquid isocyanates. Suitable examples of isocyanates for stabilization according to the present invention include monoisocyanates as well as di- and higher polyisocyanates. Specific examples are alkyl and aryl isocyanates, such as, phenyl isocyanate, para-chloro-phenyl isocyanate, meta-chlorophenyl isocyanate, alpha-naphthylisocyanate, ortho-dichlorophenyl isocyanate, methyl isocyanate, octadecyl isocyanate, ethyl isocyanate, n-propyl isocyanate, n-butyl isocyanate, ortho-chlorophenyl isocyanate, as well as diisocyanates such as meta-xylylene isocyanate, hexamethylene diisocyanate, 2,4-toluylene diisocyanate, dianisidine diisocyanate, 4,4'-diphenyl methane diisocyanate, a mixture of 80% 2,4- and 20% 2,6-toluylene diisocyanate, a mixture of 65% 2,4- and 35% 2,6-toluylene diisocyanate, substantially pure 2,6-toluylene diisocyanate, biuret polyisocyanates such as the reaction product of 3 mols of hexamethylene diisocyanate with one mol of water as disclosed in U.S. Pat. 3,124,605, urethane polyisocyanates such as the reaction product of one mol of trimethylolpropane with three mols of a mixture of 80% 2,4-toluylene diisocyanate and 20% 2,6-toluylene diisocyanate and the like. As pointed out above, however, the preferred organic isocyanate to be stabilized in accordance with this invention are those liquid organic isocyanates or liquid mixtures of isocyanates, i.e. those which are liquid at temperatures above about 10° C. A preferred type, but not necessarily all suitable mixtures thereof, is disclosed in U.S. Pat. 2,683,730. In addition to the isocyanates disclosed in that patent, one may use similar isocyanates which contain a higher percentage of organic diisocyanate. These isocyanates may be referred to generally as polyphenyl polymethylene polyisocyanates. It is preferred to use those polyphenyl polymethylene polyisocyanates which contain from about 40 to about 70% of a diphenylmethane diisocyanate, preferably 4,4-diphenylmethane diisocyanate and from about 15 to 40% triisocyanate having the formula

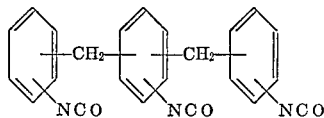

and the balance higher polyisocyanates. These isocyanates could be represented by the general formula

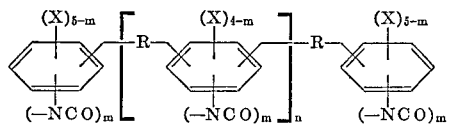

in which R is an organic radical and preferably an aliphatic radical obtained by removing the carbonyl oxygen for an aldehyde or ketone and is preferably —CH$_2$—, m is 1 or 2, X is halogen, lower alkyl or hydrogen and n is 0, 1, 2, or 3. The aliphatic radical, R, in the foregoing formula may be obtained by removing the carbonyl oxygen from any suitable aldehyde or ketone such as, formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, H$_2$C=O, the radical remaining is a methylene radical or from acetone, CH$_3$—CO—CH$_3$, the radical remaining is

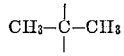

When X is halogen, it may be any suitable halogen, but is preferably chlorine or bromine; and further it is preferred that the amount of chlorine or bromine fall between about 1% and 15% by weight of the compound. When X is lower alkyl, it is most preferably methyl or ethyl but other lower alkyl radicals such as propyl, butyl and the like may be the radical, X. The polyaryl alkylene polyisocyanates of the invention are preferably mixtures of di- and higher polyisocyanates. Thus, in the formula n preferably has a value of from about 0.1 to about 1.5. To illustrate, in a mixture of isocyanates of the above formula containing 90% diisocyanate and 10% triisocyanate, n would have a value of 0.1. For a mixture containing 20% di-, 30% tri-, 30% tetra- and 20% penta-isocyanate, the average value of n would be 1.5. A most preferred value for n is between about 0.85 and about 1.1 with about 40% to about 70% of the mixture of polyisocyanates being a diisocyanate.

Isocyanates of the above formula are well known and available commercially. They may be prepared as disclosed in U.S. Pat. 2,683,730. A specific isocyanate suitable for use in accordance with the present invention may be obtained by reacting about 60 parts of aniline with about 25 parts of formaldehyde (aqueous, 37% CH$_2$O) and about 74 parts of HCl (aqueous, 30% HCl) at a temperature of about 90° C. to about 100° C. for about 1.5 to about 2 hours and then reacting this product with NaOH and separating out the crude amine. About 100 parts of phosgene are then reacted with the resulting amine, the free excess phosgene and substantially all of the solvents used, if any, are then removed, until a product having an amine equivalent of about 135 and containing about 31% free —NCO is obtained.

A specific product of this type is obtained by phosgenating the reaction product of aniline with formaldehyde, said mixture of organic polyisocyanates having the formula

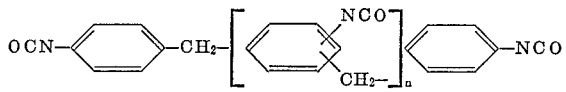

wherein n has an average value of 0.88 and contains about 50% diisocyanate and about 21% triisocyanate, the balance being tetra- and penta-isocyanates sufficient to give n a value of 0.88.

Still another type of product which is particularly adapted to use in accordance with the present invention is based on toluylene diisocyanates and polyaryl polyalkylene polyisocyanates containing both diisocyanates and triisocyanates set forth above. Any suitable mixture of toluylene diisocyanate and the polyaryl polyalkylene polyisocyanate may be used. It is desirable to use from 10 to 90% of toluylene diisocyanates and a particularly preferred mixture is one which contains at least 50% by weight of a polyphenyl polymethylene polyisocyanate and about 35 to 40% by weight toluylene diisocyanate which is preferably a mixture of about 80% 2,4- and 20% 2,6-tolylene diisocyanate. Also suitable as isocyanates are the reaction products of an excess of a polyisocyanate with an organic compound containing active hydrogen containing groups as determined by the Zerewitinoff method.

In accordance with a preferred embodiment of the invention, the amount of iron in the composition is maintained below about 200 parts per million, preferably below about 100 parts per million in order to produce a mixture of polyphenyl polymethylene polyisocyanates which have very stable properties on storage and which in turn produce a foam when reacted with a polyol in the presence of a blowing agent which has good flame resistance and other good properties including dimensional stability and the like.

The compositions of the present invention are prepared by simply mixing the stabilized ortho-ester with the organic isocyanate. The mixing may take place at any reasonable temperature preferably where the isocyanate is liquid as at room temperature. Standard handling procedures for isocyanates are adequate. The amount of stabilizer should be adjusted so that it is sufficient to prevent the undesired type of degradation and is preferably in the raneg of from about 0.001 to about 0.5 by weight based on the weight of the organic isocyanate.

The isocyanates of the present invention are useful where isocyanates have been used before, for example, for the preparation of polyurethane foam, nonporous plastics including castings such as gear wheels and the like; in addition they may be used to produce various coating compositions.

The invention is further illustrated by the following examples in which parts are by weight unless otherwise specified.

EXAMPLE 1

Samples of an isocyanate having the formula

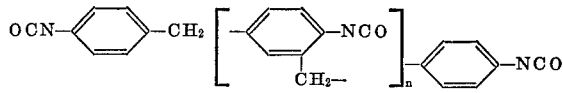

wherein $n$ has an average value of 0.88 and contains about 50% diisocyanate and about 21% triisocyanate, the balance being tetra- and penta-isocyanates sufficient to give $n$ a value of 0.88, are placed in glass screw cap bottles and the initial viscosity of the isocyanate is determined. Identical samples are prepared for each stabilizer tested and for each separate amount of the same stabilizer tested. One set of samples is stored under substantially anhydrous conditions at about 20° C. A second set of samples is stored under substantially anhydrous conditions at about 45° C. and a third set of samples has about 0.1% by weight of water added and is then stored at 20° C. The viscosity of each set of samples is measured periodically and the average percent per week increase in viscosity is as shown in the following table:

| Additive | Weight percent added | Isocyanate viscosity increase, percent per week, Room temperature | Isocyanate viscosity increase, percent per week, 45° C. | Isocyanate viscosity increase, percent, sample contained 0.1% water, after standing three days |
|---|---|---|---|---|
| Group I: | | | | |
| None (control) | 0 | 7.0 | 8.5 | 227 |
| Triethyl-orthoformate | 0.1 | 0 | 2.5 | 163 |
| Do | 0.2 | 0 | 0.6 | 23 |
| Do | 0.3 | 0 | 0.9 | 39 |
| Group II: | | | | |
| None (control) | 0 | 2.0 | 7.1 | 100 |
| Triethyl-orthoformate | 0.3 | 0.2 | 0.8 | 49 |
| Triethyl-orthoacetate | 0.1 | 0.2 | 1.4 | + |
| Triethyl-orthopropionate | 0.1 | 1.0 | 2.1 | 84 |
| Trimethyl-orthoacetate | 0.1 | 0.4 | 1.5 | 33 |
| Tri-n-butyl-orthoacetate | 0.3 | 0 | 0.2 | 25 |
| Tricrotyl-orthoformate | 0.3 | | 0.2 | 25 |
| Trimethyl-orthoformate | 0.1 | | 4.8 | + |
| Triallyl-orthoformate | 0.3 | | 1.1 | + |
| Tributyl-orthoformate | 0.3 | | 0.9 | + |
| Tridecyl-orthoformate | 0.3 | | 2.5 | + |

+ Not run.

All of the samples have essentially the same color after storage as before except the control which is considerably darker.

EXAMPLE 2

A prepolymer is prepared as follows: about 83.61 parts of the mixture of isocyanates of Example 1 are mixed with about 2.51 parts of the polyhydric polyalkylene ether prepared from pentaerythritol and propylene oxide and having an hydroxyl number of about 450 under a nitrogen blanket for about 10 minutes. The mixture is then heated to 120° F. for one hour with stirring. After cooling to room temperature, tests with an additive of the invention are conducted as follows:

A sample of the prepolymer is placed in a screw cap bottle and the initial viscosity is determined. One sample has 0.3% triethyl-ortho-formate added and the other has none. The increase in viscosity over a period of twenty days is as shown in the following table. Moreover, the change in percentage of free —NCO is as shown in the following table:

| | Run 1 | Run 2 |
|---|---|---|
| | Additive | |
| | None (control) | 0.3% triethyl-ortho formate |
| Prepolymer viscosity cps./25° C.: | | |
| Initial | 1,244 | 1,054 |
| 10 days | 1,680 | 1,240 |
| 20 days | 1,700 | 1,242 |
| Prepolymer NCO percent: | | |
| Initial | 28.2 | 27.9 |
| 10 days | 27.0 | 27.7 |

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. An organic isocyanate stabilized against viscosity changes comprising a liquid organic isocyanate selected from the group consisting of alkyl and aryl isocyanates containing a stabilizing amount of a compound selected from the group consisting of trimethyl ortho formate, triethyl ortho formate, tripropyl ortho formate, methyl diethyl ortho formate, diethyl phenyl ortho formate, diethyl propyl ortho formate, dibutyl ethyl ortho formate, tribenzyl ortho formate, tricrotyl ortho formate, trichloroethyl ortho formate, dipropyl ethyl ortho formate, dioleyl ethyl ortho formate, diisodecyl ethyl ortho formate, diisobutyl ethyl ortho formate, trimethyl ortho acetate, triethyl ortho propionate, triethyl ortho butyrate, triethyl ortho valerate, tributyl ortho caprolate, triethyl ortho enanthoate, trimethyl ethyl ortho caprylate, triethyl ortho pelargonate, triethyl ortho caprioate, triethyl ortho laurate, triethyl ortho tridecanonate, triethyl ortho myristoate, triethyl ortho pentadecanoate, triethyl ortho palmitate, triethyl ortho margarate, triethyl ortho stearate, triethyl ortho nonadecanoate, triethyl ortho acrylate, triethyl ortho methacrylate, triethyl ortho benzoate, triethyl ortho chloroacetate, triethyl ortho benzene acetate, triisodecyl ortho formate, triisobutyl ortho formate, tripropenyl ortho formate and mixed trioleyl (25% stearyl, 75% oleyl) ortho formate.

2. The product of claim 1 wherein said organic isocyanate is a liquid organic polyisocyanate.

3. The organic isocyanate of claim 1 wherein said compound is triethyl-ortho-formate.

4. The isocyanate of claim 1 wherein said organic isocyanate is a mixture of polyphenyl polymethylene polyisocyanates having from about 0.001 to about 0.5 part by weight based on the weight of said polyisocyanate of triethyl-ortho-formate.

5. The product of claim 1 wherein said organic isocyanate is the reaction product of an excess of an organic polyisocyanate with an organic compound containing active hydrogen containing groups as determined by the Zerewitinoff method.

6. The product of claim 1 wherein said compound is an ortho-ester based on formic acid.

7. The organic isocyanate of claim 1 wherein the stabilizing compound is present in an amount of from 0.001 to 0.5 part by weight based on the weight of the organic isocyanate.

8. The organic isocyanate of claim 7 wherein said stabilizing compound is triethyl-ortho-formate.

References Cited

UNITED STATES PATENTS 3,284,487  11/1966  Von Brachel ____ 260—453 XR
2,885,420  5/1959   Spiegler _____ 260—453

CHARLES B. PARKER, Primary Examiner

D. H. TORRENCE, Assistant Examiner

U.S. Cl. X.R.

260—2.5, 45.7, 45.95, 77.5, 611, 615